(12) United States Patent
Bruck et al.

(10) Patent No.: US 9,476,514 B2
(45) Date of Patent: Oct. 25, 2016

(54) VALVE, IN PARTICULAR A PRESSURE REGULATING VALVE OR PRESSURE LIMITING VALVE

(75) Inventors: Peter Bruck, Althornbach (DE); Frank Schulz, Blieskastel-Bierbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 261 days.

(21) Appl. No.: 14/123,983

(22) PCT Filed: Mar. 14, 2012

(86) PCT No.: PCT/EP2012/001139
§ 371 (c)(1),
(2), (4) Date: Jan. 10, 2014

(87) PCT Pub. No.: WO2012/167852
PCT Pub. Date: Dec. 13, 2012

(65) Prior Publication Data
US 2014/0326336 A1    Nov. 6, 2014

(30) Foreign Application Priority Data
Jun. 6, 2011   (DE) .................. 10 2011 110 257

(51) Int. Cl.
| | | |
|---|---|---|
| F16K 31/12 | (2006.01) | |
| F16K 17/22 | (2006.01) | |
| F16K 17/10 | (2006.01) | |
| F16K 31/06 | (2006.01) | |
| F16K 31/40 | (2006.01) | |
| G05D 16/20 | (2006.01) | |
| F16K 31/02 | (2006.01) | |

(52) U.S. Cl.
CPC ............. *F16K 17/22* (2013.01); *F16K 17/105* (2013.01); *F16K 31/02* (2013.01); *F16K 31/0613* (2013.01); *F16K 31/0668* (2013.01); *F16K 31/406* (2013.01); *G05D 16/2013* (2013.01); *Y10T 137/7761* (2015.04)

(58) Field of Classification Search
CPC ...... F16K 17/22; F16K 17/105; F16K 31/02; F16K 31/0613; F16K 31/0668; F16K 31/406; G05D 16/2013; G05D 16/2093; Y10T 137/7761; Y10T 137/8671; Y10T 137/86614
See application file for complete search history.

(56) References Cited

U.S. PATENT DOCUMENTS

| | | | | |
|---|---|---|---|---|
| 6,021,996 A * | 2/2000 | Nakayoshi | ........... | F15B 13/0433 123/41.49 |
| 7,950,416 B2 * | 5/2011 | Nakai | ................. | F16H 61/0251 137/625.65 |
| 2002/0101314 A1 * | 8/2002 | Oishi | .................. | F16K 31/0613 335/256 |
| 2002/0134444 A1 * | 9/2002 | Isobe | ........................ | F01L 1/34 137/625.65 |
| 2008/0042093 A1 * | 2/2008 | Kim | ........................ | F16K 47/02 251/337 |

FOREIGN PATENT DOCUMENTS

DE    102006039488 A1 *   3/2007   ......... F16K 31/0603

* cited by examiner

*Primary Examiner* — Jessica Cahill
(74) *Attorney, Agent, or Firm* — Wenderoth, Lind & Ponack, L.L.P.

(57) ABSTRACT

A valve (1), in particular a pressure regulating valve or a pressure limiting valve for controlling a pressure of a medium (3) that flows through the valve (1), includes a main stage (5) and a pilot stage (7) that actuates the main stage (5). The main stage is actuated against the effect of a restoring device (11) by an energizable actuating device (9). A pressure release stage (13) of the valve (1) has a surface area modification device (15).

21 Claims, 5 Drawing Sheets

VALVE, IN PARTICULAR A PRESSURE REGULATING VALVE OR PRESSURE LIMITING VALVE

FIELD OF THE INVENTION

The invention relates to a valve, in particular a pressure regulating valve for controlling the pressure of a medium flowing through the valve. The valve has a main stage and a pilot stage that controls the main stage and is itself controlled by an energizable actuating device against the action of a return device, and has a pressure relief stage of the valve.

BACKGROUND OF THE INVENTION

Valves, in particular for oil hydraulic systems, such as pressure regulating valves for controlling a pressure of a medium flowing through the valve are sufficiently well known. U.S. Pat. No. 4,316,599, for example, describes a proportional pressure regulating valve, which supplies an essentially constant output pressure with a variable input pressure. The output pressure of the pressure regulating valve to be controlled is preselected by a current signal originating from a corresponding control electronics for an actuating magnet of a magnetic system. Proportional pressure regulating valves in this regard are preferably designed as directly controlled piston slide valves in a three-way embodiment. Valves in this regard are used in oil hydraulic systems, for example, for controlling clutches in manual transmissions or automatic transmissions for a targeted influence on the pressure buildup and dissipation of pressure on hydraulic consumers, for remote setting of the pressure or for pilot control of hydraulic valves and hydraulic actuators in a variety of designs.

DE 10 2005 006 321 A1 discloses a valve, in particular a proportional pressure limiting valve, having a valve housing with at least two fluid connections, wherein the valve can be connected to a hydraulic drive system at a predefinable load pressure. The valve is also suitable for use in hydraulic systems with fluid media of a low viscosity due to the fact that a valve piston, which is operatively connected to a pilot seat by an energy accumulator, can be controlled by a control device. The applied consumer pressure on a fluid connection acts at least on the valve piston such that a fluid flow between the two other fluid connections in both directions within the valve housing is possible, depending on the applied consumer pressure and the actuating force of the control device so far. A main stage of the valve can be controlled by a pilot stage in the direction opposite the action of a return device by an energizable actuating device. The valve also has a pressure relief stage in its pilot stage.

DE 10 2007 015 077 A1 discloses a slide valve for hydraulic systems such as proportional pressure limiting valves or pressure compensators, having a valve housing preferably designed in the form of a screw-in cartridge. A valve slide is axially displaceable and has an inflow opening through which fluid flows into the valve housing. At least one outflow opening is formed in the wall of the valve housing and can be closed by the valve slide, depending on the axial position of the valve slide, or can be released for the outflow of fluid out of the valve housing. To reduce cavitation phenomena with the slide valve, an annular groove is cut into the inside wall of the valve housing, with the annular groove being positioned with respect to its axial position at the height of the at least one outflow opening. A control edge of the valve slide then overruns the annular groove in its movement out of the position that closes the outflow opening and into the release position. In some applications of the hydraulic or pneumatic system, a fail-safe behavior of valves is desired in this regard. In the event of a malfunction of the control of a valve, in particular in a failure of an energizable actuating device for the valve, the valve assumes a predefinable function. In particular a valve element of the valve assumes a predefinable switch position. The functions or operating points of the hydraulic system that are desired in a hydraulic system can then be selected. One example is hydraulic or pneumatic switch elements in cooling systems because when their control fails, the cooling system in this regard nevertheless maintains its function.

DE 44 42 085 A1, EP 0 030 083 A2, U.S. Pat. No. 4,750,704 and DE 30 42 015 A1 each have pilot-controlled proportional pressure regulating valves having a pressure relief stage.

SUMMARY OF THE INVENTION

An object of the present invention is to provide an improved valve, in particular a pressure regulating valve or a pressure limiting valve, for controlling a pressure of a medium flowing through the valve having a predefinable fail-safe behavior.

According to the invention, this object is basically achieved by a valve having a pressure relief stage of a pilot stage of the valve with a surface area modification device. The valve according to the invention then enables a fail-safe function due solely to the media pressure on the valve, and preferably to a media pressure of the pilot stage and an implementation of the media pressure by the surface area modification device. A valve element of the valve, in particular a fail-safe switch position, is achieved due to the surface area modification device in operative connection to the pilot stage. The inventive design of the pilot stage together with the pressure relief stage, which is formed as a surface area modification device, ensures a predefinable fail-safe behavior of the valve in the event of a failure of the energizable actuating device of the valve.

In a particularly preferred exemplary embodiment of the valve, the surface area modification device has a first, larger pressure-active surface area and a second, comparatively smaller pressure-active surface area. A media pressure, which is influenced by the pilot stage, acts on both pressure-active surface areas, which form a surface area difference. The main stage of the valve is then controlled by the pilot stage of the valve merely through the action of the media pressure to achieve a fail-safe behavior because of the predefinable surface area difference within the surface area modification device. Advantageously, the surface area modification device can be designed with the help of at least one aperture in the pilot stage. A fail-safe function is thus easily and completely integrated into the valve according to the invention.

A valve element of the main stage is advantageously moved into, and held in a predefinable position, which is determined by at least the difference in surface area of the pressure-active surface areas and a media pressure at a pressure source connection for the valve. The valve element of the main stage may also be moved by the action of the aperture and a media pressure at the pressure source connection for the valve into the predefinable position and held there. The media pressure at the pressure source connection for the valve is determined by the force $F_N$ of the actuating device, the force $F_R$ of the return device and the surface area difference $F_1-F_2$ of the pressure-active surface areas according to the formula:

$$p = \frac{(F_R - F_N)}{F_1 - F_2}.$$

The pressure at the connection changes with the magnetic force and is limited independently of the volume flow.

The valve opens on reaching the pressure of the pressure stage.

The inventive valve is particularly advantageous and is contrary to the prior art, from which prior art a "falling characteristic line" of the solenoid current plotted as a function of the media pressure on a pressure source connection of a valve is known only for so-called "pulling magnets." With the inventive valve, a "pushing" magnet" also can generate a "falling characteristic line" in this regard. In the case of the inventive valve, the actuating device for actuation of the pilot stage thus exerts a compressive force on an actuating tappet of the pilot stage to achieve the aforementioned characteristic line curve.

The actuating device is particularly preferably formed by an energizable coil device whose solenoid armature applies a compressive force to the actuating tappet of the pilot stage. With an increase in the solenoid current, the pressure on the pressure source connection of the valve drops independently of the volume flow.

In a particularly preferred exemplary embodiment of the valve, the pressure-active surface areas of the surface area modification device according to the invention are formed by diameter steps on the actuating tappet of the pilot stage, which steps are arranged on the actuating tappet at an axial spacing. Together with the bordering walls of a guide for a valve seat, the steps form a guide for the actuating tappet. This arrangement yields a particularly simple structural solution for integrating the inventive fail-safe function into the valve. No additional components are needed on the inventive valve to enable the fail-safe function. Instead, the components present are used to implement the function in this regard. This structure yields a particularly inexpensive design of the inventive valve, which can be produced easily and rapidly.

The first, larger pressure-active surface area of the surface area modification device advantageously forms a conical valve seat together with the guide for the actuating tappet. The pilot pressure limiting valve may also be designed as a slide. When the actuating device is actuated, the valve seat permits a medium to flow from the surface area modification device belonging to the pilot stage to a tank connection for the valve.

The first, larger pressure-active surface area is advantageously situated on a free end of the actuating tappet facing away from the actuating device. In a particularly preferred exemplary embodiment of the valve as an energy accumulator, the return device is preferably formed as a helical compression spring. That spring is supported on the free end of the actuating tappet and on a receptacle in the guide for the actuating tappet. The guide and the return device may also be situated in the axial area of the valve element of the main stage.

The return device may also be advantageously designed as an energy accumulator and preferably as a helical compression spring and to be situated between the first, larger and the second, smaller pressure-active surface areas of the surface area modification device. The helical compression spring may be supported at least indirectly on a receptacle for the guide of the actuating tappet and on the second, smaller pressure-active surface area. This embodiment of the inventive valve has the advantage in particular that its axial length is reduced, and the valve has a very compact design.

The inventive valve may have a pressure limiting function or a pressure regulating function and is thus designed in particular preferably as a pressure limiting valve or as a pressure regulating valve.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure and that are schematic and not to scale.

DETAILED DESCRIPTION OF THE INVENTION

Figure 1:
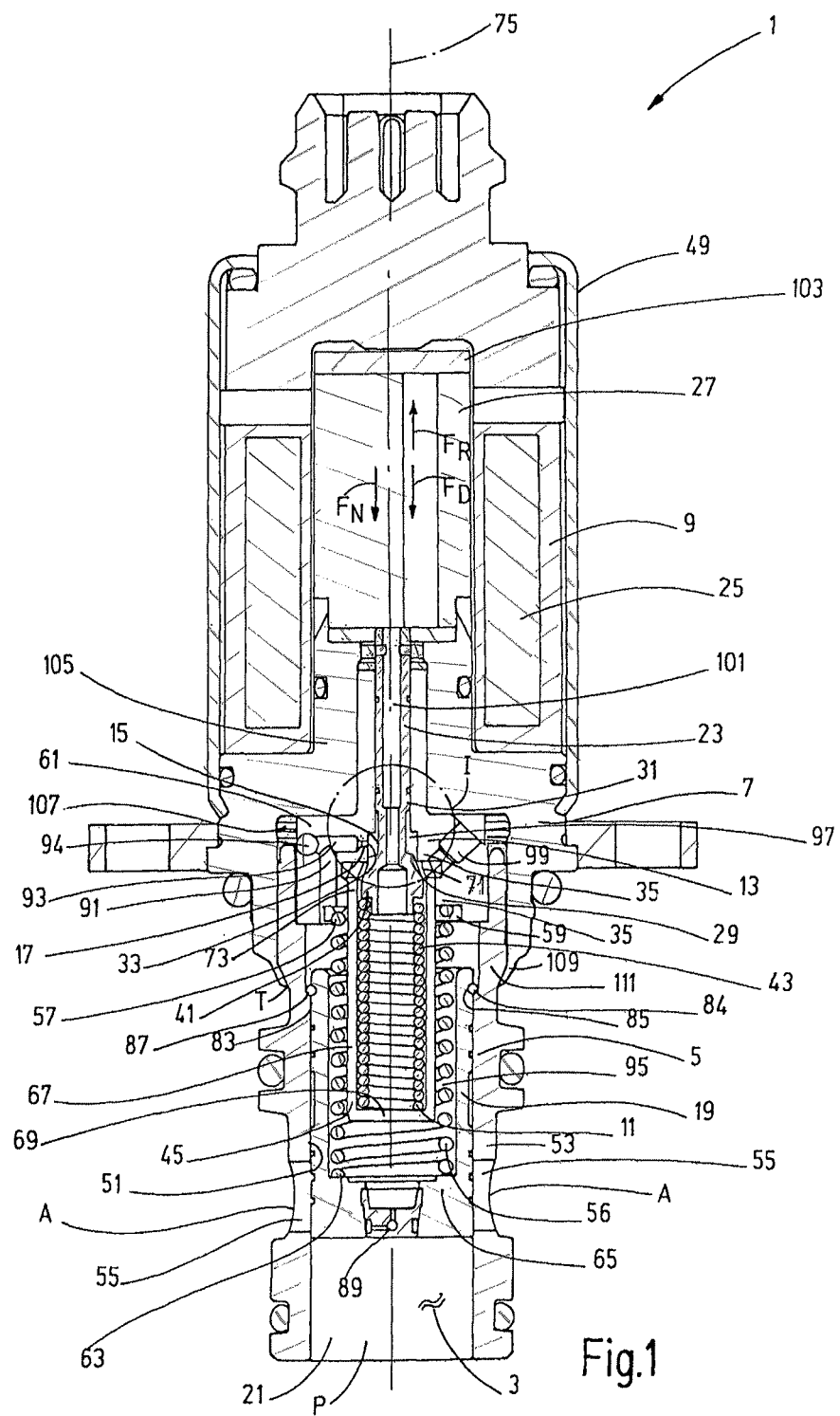
FIG. 1 is a side view in section of a valve according to a first exemplary embodiment of the invention.
Figure 2:
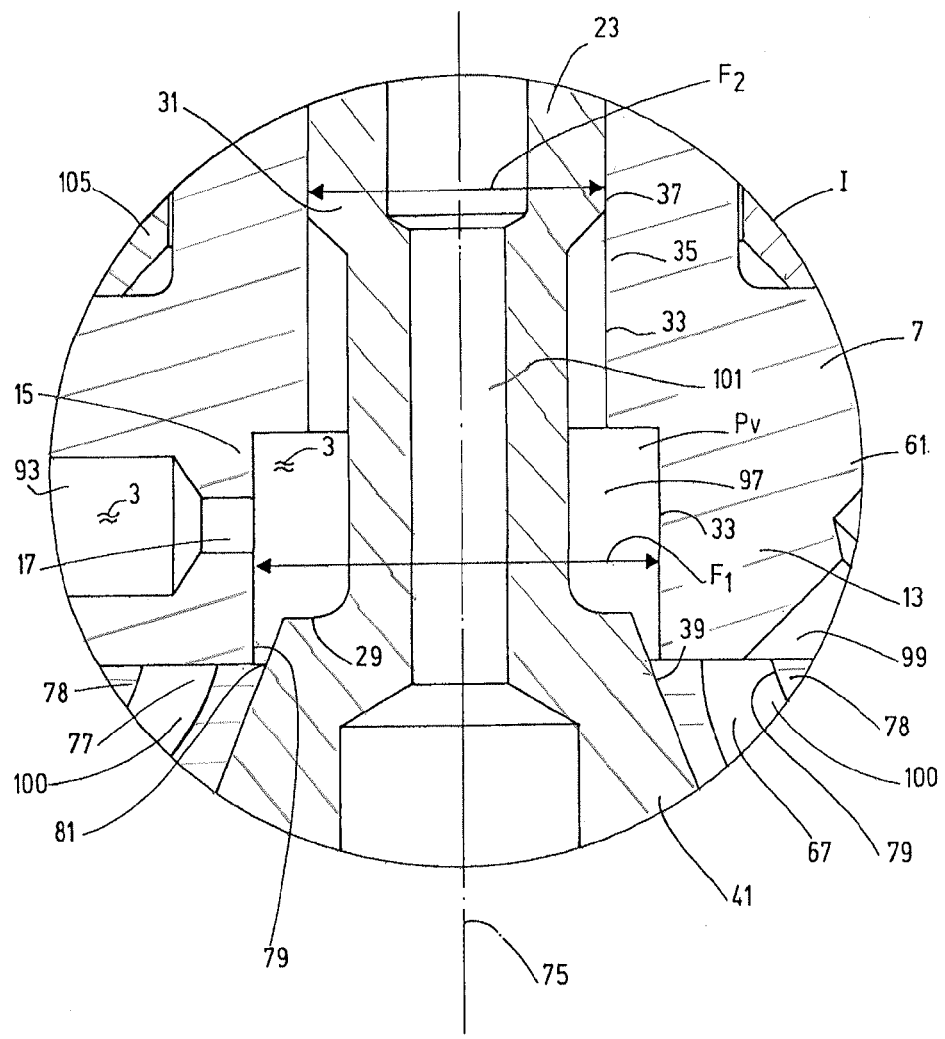
FIG. 2 is an enlarged, partial side view in section of the detail I in FIG. 1.

In a schematic longitudinal section, which is not drawn to scale, FIG. 1 shows a valve 1 for controlling a pressure p of a medium 3 flowing through the valve 1. The valve 1 has a main stage 5 and a pilot stage 7 that can be controlled by the main stage 5. The pilot stage 7 is controlled by an energizable actuating device 9 against the action of a return device 11 and has a pressure relief stage 13. As shown in FIG. 2, which is a detail I from FIG. 1 on an enlarged scale, the pressure relief stage 13 is designed in the form of a surface area modification device 15.

The surface area modification device 15 has a first, larger pressure-active surface area $F_1$ and a second, smaller pressure-active surface area $F_2$ opposite the first pressure-active surface area $F_1$. The pressure-active surface areas $F_1$, $F_2$ together form a surface area difference $F_1-F_2$. A media pressure $p_V$, which is influenced by the pilot stage 7, acts on the pressure-active surface areas $F_1$, $F_2$. Advantageously, the surface area modification device 15 may be provided with an aperture, in particular in the form of a damping aperture or throttle 17, which is upstream from the actual modification device 15 in the direction of fluid flow.

Through the action of the surface area modification device 15, a valve element 19 of the main stage 5 is kept in a position determined by at least the surface area difference $F_1-F_2$ of the pressure-active surface areas $F_1$, $F_2$ and/or by the action of at least the first aperture 17 and of the media pressure p on a pressure source connection 21 of the valve 1, in particular when the actuating device 9 is not actuated.

The media pressure p on the pressure source connection 21 of the valve 1 is determined here by the force $F_N$ of the actuating device 9, the force $F_R$ of the return device 11 and the surface area difference $F_1$–$F_2$ of the pressure-active surface areas $F_1$, $F_2$ according to the formula $$p_{MAX} = \frac{(F_R - F_N)}{F_1 - F_2},$$

where $$F_N = 0.$$

When the magnet is not actuated, the valve element automatically assumes the throttle position on reaching the maximum pressure, this position being required to achieve the maximum pressure at the given volume flow.

For actuation of the pilot stage 7, the actuating device 9 applies the force $F_N$ in the form of a compressive force $F_D$ to an actuating tappet 23 of the pilot stage 7, where preferably $F_N=F_D$. The actuating device 9 has an energizable coil device 25, in which, when energized, a solenoid armature 27 applies the compressive force $F_D$ to the actuating tappet 23 of the pilot stage 7. With an increase in the volume flow of the medium 3, which is passed through the valve 1, the pressure p of the medium on the pressure source connection 21 drops. The pressure-active surface areas $F_1$, $F_2$ are formed by diameter steps 29, 31 on the actuating tappet 23 of the pilot stage 7 and are arranged at an axial spacing on the actuating tappet 23. The wall parts of the actuating tappet 23, which border the pressure-active surface areas $F_1$, $F_2$, form a valve seat 39 and/or a valve sealing surface 37 together with the bordering walls 33 of a guide 35 on the housing side for the actuating tappet 23.

The first, larger pressure-active surface area $F_1$ of the surface area modification device 15 forms the conical valve seat 39 together the guide 35 of the actuating tappet 23. On actuation of the actuating device 9, the valve seat 39 enables a medium to flow from the surface area modification device 15 belonging to the pilot stage 7 to a tank connection T, which leads out of the housing at the location T by way of a connecting line (not shown in greater detail here). Then, a drop in pressure is on the rear end of the valve element 19, which is at the rear on the pressure source connection 21. The first, larger pressure-active surface area $F_1$ is arranged on a free end region 41 of the actuating tappet 23 facing away from the actuating device 9. The return device 11 is designed as an energy accumulator and preferably as a helical compression spring 43. The helical compression spring 43 is supported on the one free end of the actuating tappet 23 and on a receptacle 45 in a sleeve 67, which is described in greater detail below. The return device 11 or the helical compression spring 43 acts on the actuating tappet 23 with a force $F_R$ in the opposite direction of action from the compressive force $F_D$ of the solenoid armature 27 of the actuating device 9 and of the surface area modification device 15.

The valve 1 may be designed as a pressure regulating valve, but in the exemplary embodiment shown here in FIGS. 1-2, it is designed as a pressure limiting valve 49. The pressure limiting valve 49 is embodied in the manner of a directional control slide valve or as a pilot control for directional control slide valves, also for rapid-switching directional control valves for digital hydraulics. The valve element 19, designed as a cylindrical hollow piston, is axially displaceable in a longitudinal guide 51 for a cylindrical valve housing 53 in a sealed design. The valve element 19 controls the flow of a medium between the axial central pressure source connection 21 in the valve housing 53 and a tank connection T formed by radial openings 55 in the valve housing 53. Of the radial openings 55, two are shown, arranged diametrically to the longitudinal axis 75 of the valve 1. The valve element 19 is held in a position in which it blocks the radial openings 55 by a generously dimensioned helical compression spring 56. On its one free end 57 facing the actuating tappet 23, the helical compression spring 56 is supported in an annular receptacle 59 in a pilot stage housing part 61. At its other free end 63, the helical compression spring 56 is in contact with a circular disk-shaped bottom 65 of the valve element 19. In its unactuated starting position, the helical compression spring 56 is centered radially in the valve element 19 over approx. ⅘ of its total axial extent. The valve element 19 is therefore in the shape of a piston designed with long dimensions. The helical compression spring 56 serves as an adjusting element for the valve element 19 and serves to establish a position of the valve element 19 in the valve housing 53, which reflects a balance of forces between the force acting on the end surface of the piston, this force being created due to a pressure difference by the pilot oil flow through the aperture 89, and the adjusting force of the helical spring 56.

In the exemplary embodiment of the valve 1 shown in FIG. 1, the valve element 19 is in an end position produced by the adjusting force of the helical compression spring 56. In this end position, a media-carrying connecting between the pressure source connection 21 and the tank connection T is blocked. The sleeve 67 is formed in one piece and is secured in the pilot stage housing part 61 with the help of a press-fit connection. To do so, the sleeve 67 has an axial section 71 of its wall 73, which is provided with an edge section 77 that is situated on the end of the sleeve 67 at an angle of approx. 30° radially to the longitudinal axis 75 of the valve 1. With its wall parts extending parallel to the longitudinal axis 75, the sleeve 67 is connected to the wall sections 78 of a central bore 79 in the pilot stage housing part 61 with the help of a press-fit. The sleeve 67 is designed to be media-tight and also serves as the centering aid for the helical compression spring 43.

The valve element 19 also has a stop 83 on its axial end opposite the bottom 65. The stop 83 is formed by a snap ring 84, which is placed in a circumferential groove 85 in the valve element 19. The snap ring 84 protrudes, with approximately half of its cross section on the periphery, beyond the outside circumference of the valve element 19 and is in contact with the inside circumference of the longitudinal guide 51 with an annular stop face 87. The stop face 87 has the same radius as the snap ring and is formed by a reduction in the inside diameter of the circular cross section of the longitudinal guide 51. In the axial area of the longitudinal guide 51, where the pressure source connection 21, the openings 55 and essentially the valve element 19 are located, the inside diameter is smaller than in the axial region of the longitudinal guide 51 between the stop face 87 and the pilot stage housing part 61.

An aperture 89 is arranged centrally in the bottom 65 of the valve element 19. The media pressure p prevailing on the pressure source connection 21 is transferred to the side of the bottom 65 that faces away from the pressure source connection 21 through this aperture. A media chamber 95 is situated between the bottom 65 of the valve element 19 and the pilot stage housing part 61. Media chamber 95 is connected to another media chamber 97 of the surface area modification device 15 in a media-carrying design or in fluid communication accomplished by a tapping channel 91 extending in to parallel and at a radial spacing from the longitudinal axis 75 in the pilot stage housing part 61 and by a transverse channel 93 into which the tapping channel 91 opens. The media chamber 97 is bordered by the bordering wall 33 and the pressure-active surface areas $F_1$, $F_2$ formed by the actuating tappet 23. The aperture 17 is arranged centrally in the transverse channel 93 at the transition from the transverse channel 93 to the media chamber 97. The transverse channel 93 opens into the media chamber 97 in any position of the actuating tappet 23 and is closed with a sealing body 94 in a media-tight seal on its end allocated to the valve housing 53. The media pressure $p_V$ of the pilot stage 7 prevails in the media chamber 97. Based on the longitudinal axis 75 of the valve 1, the outflow channel 99 is arranged in the pilot stage housing part 61 diametrically opposite the aperture 17. The outflow channel 99 is formed in the manner of a stepped bore with a diameter that is reduced toward the wall section 77 of the sleeve 67. The outflow channel 99 opens into the additional media chamber 97 via transverse channels 100 situated on the free end of the sleeve 67. A media flow in the outflow channel 99 is controlled as a function of the position of the end region 41 of the actuating tappet 23 to the inside edge 81. In the exemplary embodiment shown in FIGS. 1, 2, the outflow channel 99 is thus provided with media flow accordingly. The outflow channel 99 is also connected to the leakage oil connection L in a media-carrying design.

In actuation of the actuating tappet 23, the valve seat 39 is opened, and the medium 3 can flow from the media chambers 95 and 97 to the outflow channel 99 and to the leakage oil connection L. This action in turn results in a pressure drop in the media chambers 95, 97, so that the valve element 19 is acted upon by a smaller force acting in the direction opposite the media pressure p on the pressure source connection 21. The medium 3 can thus also flow from the pressure source connection 21 to the tank connection because the valve element 19 moves upward in the direction of view in FIG. 1. Because of the arrangement of the pressure-active surface areas $F_1$, $F_2$ on the actuating tappet 23, the result is an adjusting force of the surface area modification device 15 directed in the same direction as the compressive force $F_D$ on the energizable coil device 25 due to the media pressure $p_V$ of the pilot stage 7, in particular in the media chamber 95.

The actuating tappet 23 has a media channel 101 extending centrally and leading from the interior of the sleeve 67 to an armature space 103 for the solenoid armature 27. In actuation of the actuating tappet 23 by the solenoid armature 27, the armature space 103 is thus equalized in pressure to the extent that the pressure of the leakage oil connection of the pilot stage 7 prevails therein. The valve housing 53 is secured in a nonsealing manner via a plug connection in a pole pipe socket 105. The pilot stage housing part 61 protrudes through the pole pipe socket 105 with its section forming the guide 35 for the actuating tappet 23. The pole pipe socket 105 is provided with a peripheral edge 109, which faces the valve housing 53. The peripheral edge 109 has a much smaller wall thickness than the additional wall thicknesses of the pole pipe socket 105 and is flange-connected to the valve housing in the area of a conical constriction 111 on the outside diameter of the valve housing 53.

The valve 1 shown in FIG. 1 has a very compact design in the axial direction, in particular because the helical compression spring 43 forming the return device 11 is situated almost completely coaxially in the axial region of the helical compression spring 56. The valve 1 has only a few components because multiple functions are implemented in virtually each component. The valves shown in FIGS. 3 and 4 in the respective details III and V are designed in one case as a pressure limiting valve (FIG. 3) and in the other case as a pressure regulating valve (FIG. 4), which differ from the embodiment shown in FIGS. 1 and 2 primarily in the modified allocation of the components. The same reference numbers as those used in FIGS. 1 and 2 are used for the same components, but each number in FIG. 3 has been increased by 200. The same reference numbers as those used in FIGS. 1 and 2, but increased by 400 in each case here, are used for the same components in FIG. 4. The statements made with regard to FIGS. 1 and 2 also apply accordingly for the exemplary embodiments described below.

Figure 3:
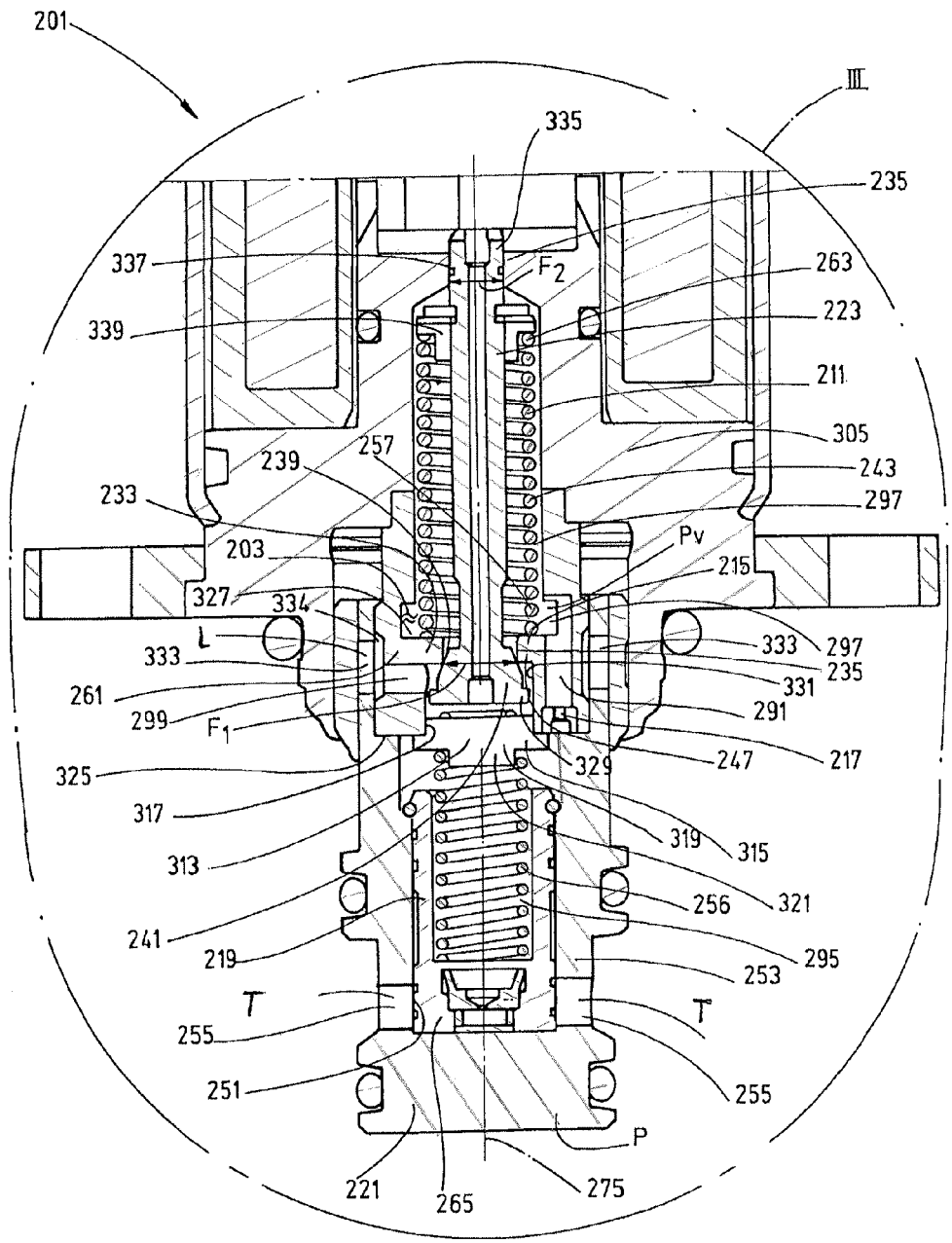
FIG. 3 is an enlarged, partial side view in section of a pressure limiting valve according to a second exemplary embodiment of the invention.

The valve 201, shown partially in FIG. 3, has a valve housing 253 having a central axial pressure source connection 221 on its free axial end. Likewise, as shown with the valve 1 in FIG. 1, radial openings 255 are provided in the cylindrical valve housing 253. The openings 255 form the tank connection T for a hydraulic device (not shown). A cylindrical valve element 219 is arranged to be axially displaceable in a cylindrical longitudinal guide 251. The valve element 219 is shown in an axial end position in which a media-carrying connection from the pressure source connection 221 to the power supply A is blocked. The helical compression spring 256, which acts upon the valve element 219 with a spring force, is supported on the bottom 265 of the valve element 219 and on an intermediate piece 313. The intermediate piece 313, which is shaped in the manner of a disk, is situated with the help of a diameter step 315 in a central circular opening 317 in the pilot stage housing part 261. With a pin 321 formed by an additional diameter step 319, the intermediate piece 313 engages axially in the helical compression spring 256, centering spring 256 at the end.

In the direction of view in FIG. 3, the tapping channel 291 extends parallel to the longitudinal axis 275 at the right of and at a radial spacing from the longitudinal axis 275 in the pilot stage housing part 261. The tapping channel 291 extends in the manner of a blind hole bore in the pilot stage housing part 261 and opens into the media chamber 297 at one end in a peripheral groove 327 in the interior of the pilot stage housing part 261. At its free end, the tapping channel 291 opens into the aperture 217, which opens into the media chamber 295 on the end wall 325 of the pilot stage housing part 261. The aperture 217 is thus situated next to the end surface 325 in the tapping channel 291. The larger pressure-active surface area $F_1$ of the surface area modification device 215 is defined by the inside cross-sectional area of a bore 331 in the pilot stage housing part 261. Bore 331 is adjacent to the peripheral groove 327 and takes over the guidance 235 of the actuating tappet 223 on its end area 241. The end region 241, which tapers conically toward the bore 331, is in sealing contact with the bordering wall 233 of the bore 331. On its end facing the media chamber 295, the actuating tappet 223 has a radially projecting strip-type peripheral edge 329. In the opened state of the valve seat 239, the peripheral edge 329 serves to deflect any medium 203 coming out of the media chamber 297 to the leakage oil connection L. The outflow channel 299 is designed as a radial bore 331, at an angle of approx. 90° to the longitudinal axis 275 in the pilot stage housing part 261. The outflow channel 299 opens into the leakage oil connection L, which is situated with the ring channel 334 in the valve housing 253 through an opening 333 adjacent to the bore 331.

On its end 335 opposite the end region 241, the actuating tappet 223 is guided slidingly with a seal in an opening 337 belonging to the guide 235 in the pole pipe socket 305. The cross-sectional area of the end 335 defines the second, smaller pressure-active surface area $F_2$. The helical compression spring 243 closing the valve seat 239 and forming the return device 211 is arranged in the media chamber 297. One spring end 257 is supported on a receptacle 247 of the guide 235 of the actuating tappet 223. The other end 263 of the helical compression spring 243 is releasably secured in a form-fitting manner by a centering sleeve 339 placed around the actuating tappet 223 and a form-fitting element between the actuating tappet 223 and the centering sleeve 339 on the actuating tappet 223. The bordering walls 233 of the guide 235, which partially define the surface area modification device 215, are formed by parts of the pole pipe socket 305 and parts of the pilot stage housing part 261.

Figure 4:
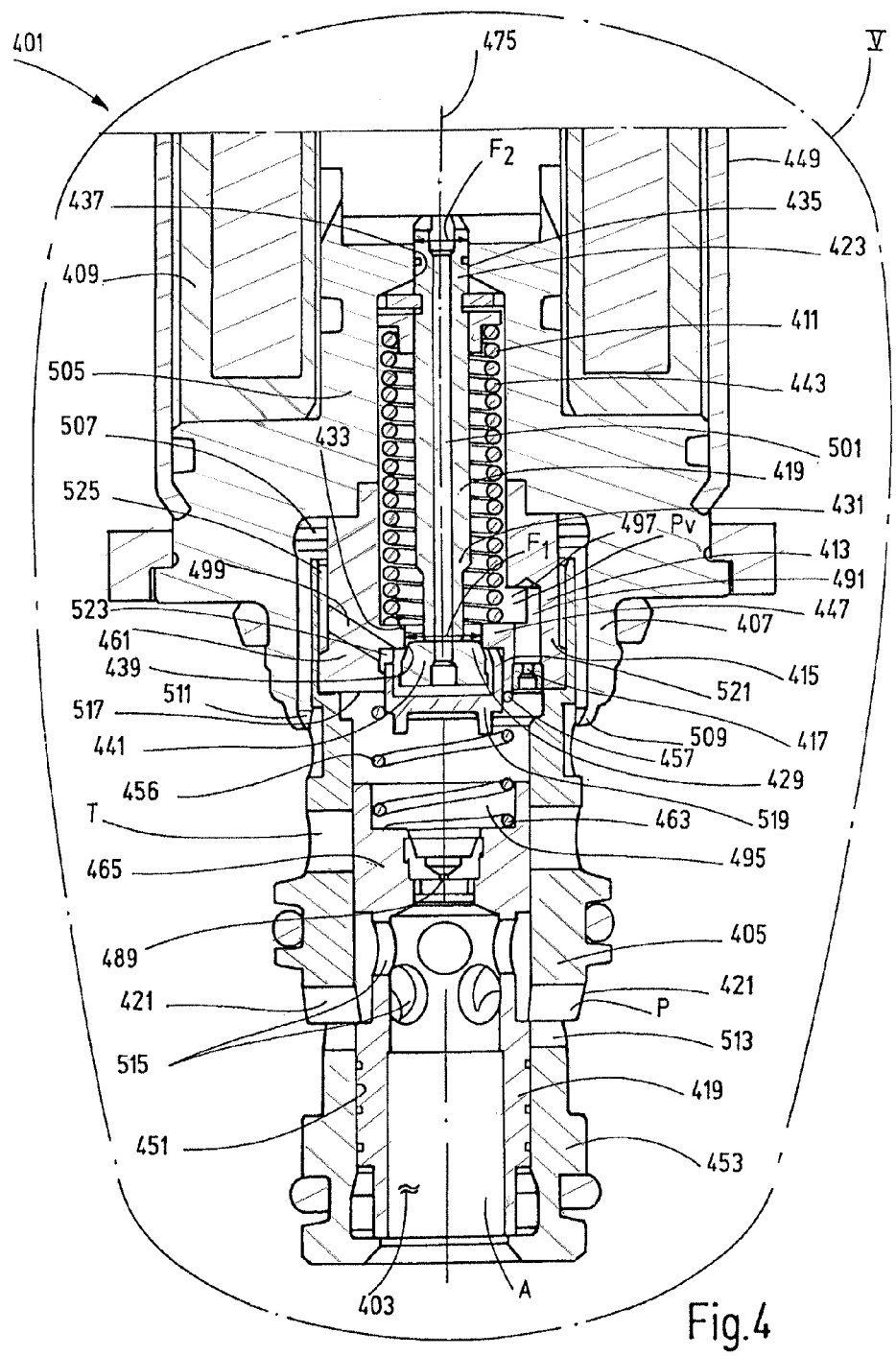
FIG. 4 is an enlarged, partial side view in section of a pressure regulating valve according to a third exemplary embodiment of the invention.

According to the detail V in FIG. 4, another exemplary embodiment of a valve 401, which is formed as a pressure regulating valve 449, is shown. The pressure source connection 421 is formed by bores 513 passing radially through wall sections of the valve housing 453. Of a plurality of bores 513, only two diametrically opposite bores are shown here. The medium 403 can pass through the bores 513, through valve element openings 515, passing radially through the valve element 419 and into the interior of the hollow cylindrical valve element 419. The valve element openings 515 are arranged in two rows axially with a radial offset. One valve element opening 515 of one row and two valve element openings 515 of another row are shown here.

The power supply A is arranged centrally axially on the lower end of the valve housing 453 in the direction of view in FIG. 4. The bottom 465 of the valve element 419 is arranged on the end of the valve element 419 facing the pilot stage housing part 461. The aperture 489 is again situated in the piston 465. Depending on the position of the valve element 419 in the longitudinal guide 451, medium 403 can flow from the pump connection P to the power source A and from the mains connection to the tank connection T formed by radial openings in the valve housing 453. The media pressure p on the load A in the case of the pressure regulator according to FIG. 4 is likewise determined by the force ($F_N$) of the actuating device (9), the force ($F_R$) of the return device (11) and of the surface area difference ($F_1$–$F_2$) of the pressure-active surface areas ($F_1$, $F_2$) according to the equation:

$$p = \frac{(F_R - F_N)}{F_1 - F_2};$$

and decreases with an increase in the solenoid current through the actuating element (9).

In contrast with the exemplary embodiment shown in FIG. 3, the helical compression spring 456, with its one end 457 acting on the valve element 419 with an adjusting force in the sense of a closed or mostly closed media-carrying connection between the pressure source connection 421 and the mains connection A, is in direct contact with the end surface 517 of the pilot stage housing part 461 facing the media chamber 495, and is supported at its other end on the bottom 465 of the valve element 419. A closure element 519 is pressed with a seal into the pilot stage housing part 461 from its end surface 517 into an opening 521 receiving the end region 441 of the actuating tappet 423. The sealing element 519 also serves as a centering aid for the helical compression spring 456. The outflow channel 499 is guided diagonally upward by an outflow chamber 523 in the direction of view in FIG. 4 through the pilot stage housing part 461 and opens into a ring channel 525. The ring channel 525 is arranged radially between the pilot stage housing part 461 and the valve housing 453 and again opens into the tank connection T—shown here as an axial groove. If the actuating device 409 is not actuated, the valve element 419 assumes a position in the exemplary embodiment shown in FIG. 4, such that the working pressure at A assumes the maximum pressure defined by the spring 443.

Figure 5:
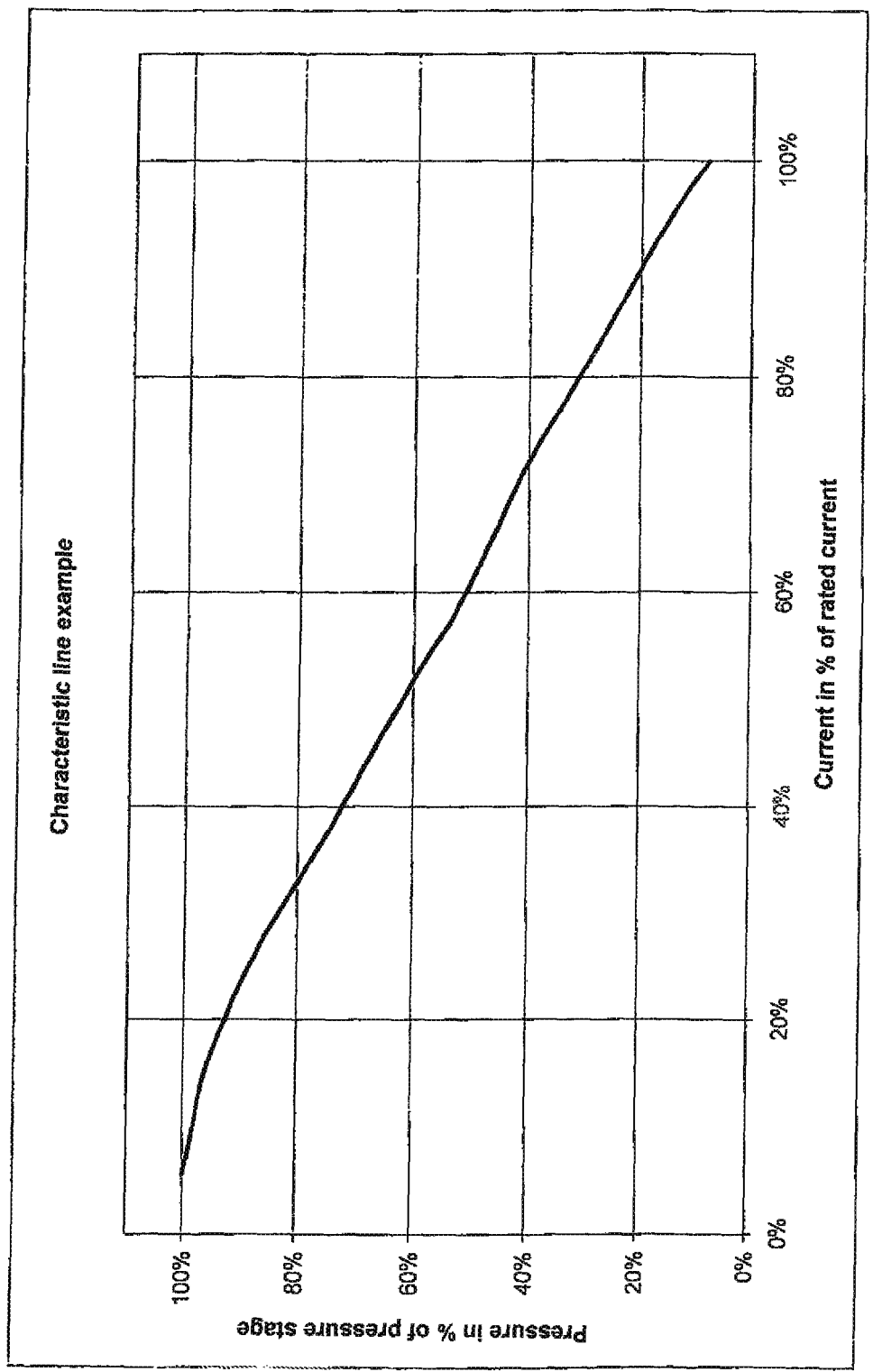
FIG. 5 is a graph of a characteristic line curve with the media pressure prevailing on the pressure source connection of the respective valve, plotted as a function of the control current for the actuating magnet of the valve.

FIG. 5 shows as an example a characteristic line curve 120 in the manner of a graph of the media pressure p on the pressure source connection 21, in particular the valve 1 according to FIG. 1, plotted as a function of the actuating current I. When the coil device 25 is actuated, the pressure on consumer A is reduced steadily and medium flows from A to T. The media pressure p on the pressure source connection 21 drops. The coil device 25 is formed in the manner of a "pushing electromagnet." As FIG. 5 shows, the characteristic lines obtained with the inventive valve 1 are similar to those possible previously from the prior art only when using so-called "pulling magnets," which fundamentally require more components and a larger installation space.

While various embodiments have been chosen to illustrate the invention, it will be understood by those skilled in the art that various changes and modifications can be made therein without departing from the scope of the invention as defined in the claims.

The invention claimed is:

1. A valve for controlling pressure of a medium flowing through the valve, comprising:
    a valve housing;
    a main stage in said valve housing;
    a pilot stage in fluid communication with and controlling said main stage and having a pressure relief stage with a surface area modification device; and
    an energized actuator connected to and controlling said pilot stage against action of a return device connected to said pilot stage, said actuator applying a compressive force to an actuating tappet of said pilot stage.

2. A valve according to claim 1 wherein
    said surface area modification device comprises a throttle.

3. A valve according to claim 1 wherein
    the valve is a proportional pressure limiting valve.

4. A valve according to claim 1 wherein
    the valve is a proportional pressure regulating valve.

5. A valve according to claim 1 wherein
    said surface area modification device comprises a first pressure-active surface area and a second pressure-active surface area opposite to and smaller than said first pressure-active surface area; and
    a media pressure, influenced by said pilot stage, acts on said first and second pressure-active surface areas forming a surface area difference between said first and second pressure-active surface areas.

6. A valve according to claim 5 wherein
    said surface area modification device comprises a throttle.

7. A vale according to claim 6 wherein
    said main stage comprises a valve element, said surface area modification device maintaining said valve element in a certain predefinable position determined by at least one of said surface area difference or an effect of said throttle with a media pressure at a pressure source connection of said valve housing when the actuator is not actuated.

8. A valve according to claim 7 wherein
the media pressure on said pressure source connection is determined by an actuator force $F_N$ of said actuator, by a return force $F_R$ of said return device and by said surface area difference ($F_1$-$F_2$) according to a formula of:

$$p = \frac{(F_R - F_N)}{F_1 - F_2}$$

and
the media pressure on said pressure source connection drops with an increase in flow volume of medium flowing through said valve housing.

9. A valve for controlling pressure of a medium flowing through the valve, comprising:
a valve housing;
a main stage in said valve housing having a valve element;
a pilot stage in fluid communication with and controlling said main stage and having a pressure relief stage with a surface area modification device, said surface area modification device including a first pressure-active surface area, a second pressure-active surface area opposite to and smaller than said first pressure-active surface area and a throttle;
a media pressure, influenced by said pilot stage, acting on said first and second pressure-active surface areas forming a surface area difference between said first and second pressure-active surface areas; and
an energized actuator connected to and controlling said pilot stage against action of a return device connected to said pilot stage, said surface area modification device maintaining said valve element in a certain predefinable position determined by at least one of said surface area difference or an effect of said throttle with a media pressure at a pressure source connection of said valve housing when the actuator is not actuated, said actuator including an energizable coil device having a solenoid armature applying the compressive force on an actuating tappet of said pilot stage so that the media pressure on said pressure source connection drops with an increase in solenoid current.

10. A valve according to claim 9 wherein
said first and second pressure-active surfaces comprise diameter steps on said actuating tappet of said pilot stage, said diameter steps being spaced along a longitudinal axis of said actuating tappet and forming said surface area modification device with bordering walls of a guide receiving said actuating tappet, said bordering walls forming a valve sealing surface and a valve seat.

11. A valve according to claim 10 wherein
said first pressure-active surface and said guide form at least one of a conical valve seat or a cylindrical valve seat; and
said valve seat permits a media flow from said surface area modification device to a tank connection of said valve housing, said surface area modification device being in said pilot stage.

12. A valve according to claim 10 wherein
said first pressure-active surface area is on a free end of said actuating tappet facing away from said actuator; and said return device comprises a helical compression spring supported on a free end of said actuating tappet and on a receptacle of said guide.

13. A valve according to claim 10 wherein
said return device comprises a helical compression spring between said first pressure-active surface area and said second pressure-active surface area and is supported on a receptacle of said guide and on said second pressure-active surface area.

14. A valve for controlling pressure of a medium flowing through the valve, comprising:
a valve housing;
a main stage in said valve housing;
a pilot stage in fluid communication with and controlling said main stage and having an actuating tappet;
an energized actuator connected to and controlling said pilot stage against action of a return device connected to said pilot stage, said actuator applying a compressive force to said actuating tappet; and
a pressure relief stage being part of said pilot-stage and having a surface area modification device, said surface area modification device including a first pressure-active surface area opposite to and smaller than said first pressure-active surface area, said first and second pressure-active surface areas forming a surface area difference, said first and second pressure-active surfaces including diameter steps on said actuating tappet of said pilot stage, said diameter steps being spaced along a longitudinal axis of said actuating tappet and forming said surface area modification device with bordering walls of a guide receiving said actuating tappet, said bordering walls forming a valve sealing surface and a valve seat.

15. A valve according to claim 14 wherein
said first pressure-active surface and said guide form at least one of a conical valve seat or a cylindrical valve seat; and
said valve seat permits a media flow from said surface area modification device to a tank connection of said valve housing, said surface area modification device being in said pilot stage.

16. A valve according to claim 14 wherein
said first pressure-active surface area is on a free end of said actuating tappet facing away from said actuator; and
said return device comprises a helical compression spring supported on a free end of said actuating tappet and on a receptacle of said guide.

17. A valve according to claim 14 wherein
said return device comprises a helical compression spring between said first pressure-active surface area and said second pressure-active surface area and is supported on a receptacle of said guide and on said second pressure-active surface area.

18. A valve according to claim 14 wherein
said surface area modification device comprises a throttle.

19. A vale according to claim 18 wherein
said main stage comprises a valve element, said surface area modification device maintaining said valve element in a certain predefinable position determined by at least one of said surface area difference or an effect of said throttle with a media pressure at a pressure source connection of said valve housing when the actuator is not actuated.

20. A valve according to claim 19 wherein
the media pressure on said pressure source connection is determined by an actuator force $F_N$ of said actuator, by a return force $F_R$ of said return device and by said surface area difference ($F_1$-$F_2$) according to a formula of:

$$p = \frac{(F_R - F_N)}{F_1 - F_2};$$

and the media pressure on said pressure source connection drops with an increase in flow volume of medium flowing through said valve housing.

21. A valve according claim 19 wherein said actuator comprises an energizable coil device having a solenoid armature applying the compressive force on an actuating tappet of said pilot stage so that the media pressure on said pressure source connection drops with an increase in solenoid current.

* * * * *